United States Patent
Friedman (10) Patent No.: US 7,248,579 B1
(45) Date of Patent: Jul. 24, 2007

(54) SYSTEM AND METHOD FOR PROVIDING A LINK STATE DATABASE (LSDB) SNAPSHOT FOR NEIGHBOR SYNCHRONIZATION

(75) Inventor: Barry D. Friedman, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1075 days.

(21) Appl. No.: 10/271,275

(22) Filed: Oct. 15, 2002

(51) Int. Cl.
*H04L 12/28* (2006.01)
*G06F 15/16* (2006.01)

(52) U.S. Cl. .................. 370/389; 370/401; 709/230

(58) Field of Classification Search ........ 370/401–406, 370/389, 392
See application file for complete search history.

(56) References Cited

U.S. PATENT DOCUMENTS

| | | | |
|---|---|---|---|
| 5,519,704 A | 5/1996 | Farinacci et al. | |
| 5,964,841 A | 10/1999 | Rekhter | |
| 6,195,705 B1 | 2/2001 | Leung | |
| 6,950,427 B1 * | 9/2005 | Zinin | 370/386 |

OTHER PUBLICATIONS

U.S. Pending Patent Application for Technique for Pesynchronizing LSDB in OSPF After a Software Reload in a Non-Stop Forwarding Intermediate Node of a Computer Network, by Alexey Dimitrievich Zinin, U.S. Appl. No. 09/925,800, filed Aug. 9, 2001.

U.S. Pending Patent Application for Technique for Restoring Adjacencies in OSPF in a Non-Stop Forwarding Intermediate Node of a Computer Network by Alexey Dimitrievich Zinin, U.S. Appl. No. 09/925,827, filed Aug. 9, 2001.

Moy, J., OSPF Version 2, Request for Comments 2328, Network Working Group, Internet Engineering Tast Force, 1998, pp. 1-244.

Perlman, R., INTERCONNECTIONS, Bridges and Routes, Second Edition, 1992, pp. 289-306.

* cited by examiner

*Primary Examiner*—Chau Nguyen
*Assistant Examiner*—U-Lun Wang
(74) *Attorney, Agent, or Firm*—Cesari and McKenna, LLP (57) ABSTRACT

A method and apparatus resynchronizes a link state database (LSDB) of router with the LSDB of a neighboring router ("neighbor") while maintaining an existing adjacency with the neighbor in a computer network. An out-of-band resynchronization process executes on the routers to essentially maintain the existing adjacency between the router and neighbor, rather than resetting that adjacency as defined by a conventional resynchronization approach. By keeping the adjacency "up" from the perspective of a routing protocol, such as the Open Shortest Path First routing protocol, the adjacency can be used for continued data traffic to and from the router.

27 Claims, 10 Drawing Sheets

| LINK ID 805 | ADV ROUTER 810 | AGE 815 | SEQUENCE NO. 820 | CHECKSUM 825 | BITFIELD 830 |
|---|---|---|---|---|---|
| 203.250.13.41 | 203.250.13.41 | 179 | 0x80000029 | 0x9ADA | 3 |
| ... | ... | ... | ... | ... | ... |

SYSTEM AND METHOD FOR PROVIDING A LINK STATE DATABASE (LSDB) SNAPSHOT FOR NEIGHBOR SYNCHRONIZATION

FIELD OF THE INVENTION

This invention relates generally to computer networks, and more particularly, to resynchronization of a routing protocol database within an intermediate node of a computer network.

BACKGROUND OF THE INVENTION

A computer network is a geographically distributed collection of interconnected communication links and subnetworks for transporting data between nodes, such as computers. Many types of computer networks are available, with the types ranging from local area networks (LANs) to wide area networks (WANs). A LAN is an example of a subnetwork that provides relatively short distance communication among the interconnected stations, whereas a wide area network enables long distance communication over a larger geographic area using links provided by public or private telecommunications facilities. The nodes typically communicate by exchanging discrete frames or packets of data according to predefined protocols. In this context, a protocol consists of a set of rules defining how the nodes interact with each other.

Computer networks may be further interconnected by an intermediate node, called a router, to extend the effective "size" of each network. Since management of a large system of interconnect computer networks can prove burdensome, smaller groups of computer networks may be maintained as routing domains or autonomous systems. The networks within an autonomous system are typically coupled together by conventional intradomain routers. These routers manage communication among local networks within their domains and communicate with each other using an intradomain routing (or an interior gateway) protocol. An example of such a protocol is the Open Shortest Path First (OSPF) routing protocol described in *Request for Comments (RFC) 2328, OSPF Version 2*, by J. Moy (1998), which is hereby incorporated by reference. The OSPF protocol is based on link-state technology and, therefore, is hereinafter referred to as a link state routing protocol.

Each router running the link state routing protocol maintains an identical link state database (LSDB) describing the topology of the autonomous system (AS). Each individual piece of the LSDB is a particular router's local state, e.g., the router's usable interfaces and reachable neighbors or adjacencies. As used herein, neighboring routers (or "neighbors") are two routers that have interfaces to a common network, wherein an interface is a connection between a router and one of its attached networks. Moreover, an adjacency is a relationship formed between selected neighboring routers for the purpose of exchanging routing information and abstracting the network topology. One or more router adjacencies may be established over an interface.

The adjacencies are established and maintained through the use of the well-known Hello protocol. Broadly stated, the Hello protocol ensures that communication between neighbors is bi-directional by periodically sending Hello packets out of all of the router interfaces. Bi-directional communication is indicated when the router "sees" itself listed in the neighbor's Hello packet. On broadcast and non-broadcast multi-access (NBMA) networks, the Hello protocol elects a designated router (DR) and backup designated router (BDR) for the network.

The infrastructure of a typical router comprises functional components organized as a control plane and a data plane. The control plane includes the functional components needed to manage the traffic forwarding features of the router. These features include routing protocols, configuration information and other similar functions that determine the destinations of data packets based on information other than that contained within the packets. The data plane, on the other hand, includes functional components needed to perform forwarding operations for the packets.

For a single processor router, the control and data planes are typically implemented within the single processor. However, for some high performance routers, these planes are implemented within separate devices of the intermediate node. For example, the control plane may be implemented in a supervisor processor, such as a route processor, whereas the data plane may be implemented within a hardware-assist device, such as a co-processor or a forwarding processor. In other words, the data plane is typically implemented in a specialized piece of hardware that is separate from the hardware that implements the control plane.

The control plane generally tends to be more complex than the data plane in terms of the quality and quantity of software operating on the supervisor processor. Therefore, failures are more likely to occur in the supervisor processor when executing such complicated code. In order to ensure high availability in an intermediate network node, it is desirable to configure the node such that if a failure arises with the control plane that requires restarting and reloading of software executing on the supervisor processor, the data plane continues to operate correctly. Restarting and reloading of control plane software may be necessary because of a failure with the routing protocol process, e.g., an OSPF module, or a software upgrade to the OSPF module. A router that is configured to enable its data plane to continue packet forwarding operations during restart and reload of the control plane software is referred to as a non-stop forwarding (NSF) capable router.

Each router distributes its local state throughout the domain in accordance with an initial LSDB synchronization process and a conventional asynchronous flooding algorithm. The initial LSDB synchronization procedure is performed when the router is initially connected to the network, whereas the flooding procedure is performed to ensure continuous LSDB synchronization in the presence of topology changes after the initial procedure is completed. In order to guarantee convergence of a link state routing protocol, it should be ensured that link state protocol data units (PDUs) that originate after an initial LSDB synchronization between neighbors is completed and delivered to all routers within the flooding scope limits. These limits may comprise an area or the entire AS, depending on the protocol and the type of link-state PDU. An area is a collection or group of contiguous networks and nodes (hosts), together with routers having interfaces to any of the included networks. Each area runs a separate copy of the link state routing algorithm and, thus, has its own LSDB. In the case of OSPF, the PDU is a link state advertisement (LSA) packet comprising a unit of data describing the local state of a router or network. The collected PDUs of all routers and networks form the LSDB for the particular link state routing protocol.

Coherency of the LSDB is needed for link state routing protocols, such as OSPF, to correctly calculate routing information. In order for a NSF-capable router to reload its OSPF routing protocol software, it must be able to download LSA packets received from the neighbors into its LSDB without destroying ("dropping") the adjacencies with those neighbors. An OSPF router typically resynchronizes its LSDB with the LSDB of a neighbor by forcing a finite state machine (FSM) of the neighbor into a particular state, e.g., from a Full state to an ExStart state. The router provides a FSM per neighbor at each of its interfaces and the FSM implements various states of the adjacency between the router and its neighbor.

Yet, the OSPF standard (RFC 2328) does not allow routers to resynchronize their LSDBs without changing the topological view of the network. That is, RFC 2328 does not define a means to resynchronize the databases between two neighbors without "flapping" (i.e., bringing down) the adjacency between the neighbors. Bringing down the adjacency generally disrupts traffic; this is particularly significant if the router supports failure recovery and is still capable of forwarding traffic. Moreover, bringing down all adjacencies of the router creates unnecessary network events, forcing all routers in the network to compute alternate paths.

According to the OSPF standard, after two routers have established an adjacency (i.e., the neighbor FSMs have reached Full state), the routers announce the adjacency states in their router-LSAs. The asynchronous flooding algorithm ensures that the LSDBs of the routers maintain synchronization in the presence of topology changes. However, if routers need to resynchronize their LSDBs, they cannot do so without placing the neighbor FSMs into the ExStart state. This effectively causes the adjacencies to be removed from the router-LSA packets, which may not be acceptable in some cases such as, e.g., when a NSF router restarts after reloading its routing protocol software.

Specifically, restarting of the NSF router should not impact forwarding operations. To that end, the router (i) relearns its prior existing neighbors in order to maintain those existing adjacencies and (ii) acquires all LSA packets of the neighbors to ensure coherency of its LSDB and, ultimately, its routing tables. These actions are preferably transparent to the neighbors so that they do not place their neighbor FSMs (and their adjacencies with the NSF router) into the ExStart state. Placing the neighbor FSMs into the ExStart state destroys ("drops") the adjacencies with the NSF router and causes the neighbors (and other routers) to stop listing those adjacencies in their router-LSAs. This eventually leads to rerouting of traffic around the NSF router, thus making the router non-NSF capable. Yet, as noted, LSDB resynchronization typically requires that the neighbor FSMs be placed in the ExStart state.

The ExStart state is used to decide which router is the master, and to decide upon an initial DD sequence number. Once the ExStart state has been completed the router will move into the Exchange state where the router describes its entire link state database to its neighbor. This description is accomplished by sending Database Description (DBD) packets to the neighbor. Each DBD packet has a DD sequence number and will be explicitly acknowledged by the neighbor. According to the OSPF standard, only one DBD packet may be outstanding at any given time. In conventional resynchronization techniques, all DBD packets are generated and stored in packet buffer memory while awaiting transfer to a particular router's neighbor. As multiple copies of the database information will be stored in the packet buffer memory, it is possible to exhaust the available packet buffer memory of a router, thereby significantly degrading its data forwarding performance.

SUMMARY OF THE INVENTION

The disadvantages of the prior art are overcome by providing a system and method for performing an initial EXCHANGE state step of capturing database contents while utilizing a minimum amount of transient memory, such as packet buffers. The system and method do not require multiple copies of database description (DBD) packets to be stored in packet buffer memory. To that end, a snapshot resynchronization process executes on the routers to generate appropriate database descriptor packets from a snapshot of the routers link state database. This enables the existing adjacency between the router and neighbor to be maintained, rather than resetting the adjacency as defined by conventional resynchronization approaches. By keeping the adjacency active from the perspective of a routing protocol, such as the open shortest path first (OSPF) routing protocol, the adjacency can be used for continued data traffic to and from the router.

Specifically, when a resynchronization is requested, the router obtains an index number associated with the neighbor to be updated. The router proceeds through the linked state database and activates a bit of a bit field associated with each entry of the database for the specified neighbor. This procedure identifies those entries in the database that are to be synchronized with the neighbor of the router. The system and method then proceed to allocate a buffer entry and copy any records the link state database that have the appropriate index number bit set to the packet buffer. This procedure continues until the packet buffer is full. Once the packet buffer is full the database description packet (DBD) is sent to the neighbor.

If the DBD packet times out, then the procedure generates another packet to be sent. Once the database description has been acknowledged, the system and method then deactiviate all of the bits sent from records which were sent in the previous packet. The system and method then proceeds from the stopping point of the previous packet and continues on creating another DBD packet to be sent. This procedure continues until all of the database information has been transmitted to the neighbor. Once the transfer is complete, the system and method releases the index number (for reuse), as well as other tracking information.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

A. Network Environment

In known router link state database resynchronization techniques, once the router completed the ExStart state and then entered Exchange state, all adjacencies would be broken and a new link state database would be generated. During the generation of the link state database, multiple copies of database descriptor packets would be stored in packet buffer memory. As the OSPF protocol requires that only one outstanding database descriptor packet is outstanding at any given time, a router could exhaust its available packet buffer memory by storing multiple database description packets while awaiting acknowledgement of previously sent database description packets. The present invention is directed to a technique that allows a router to resynchronize its link state database with a link state database of a neighbor without the requirement of storing multiple copies of the database information in the router's packet buffer memory. By way of further background, the environment of a group of linked routers implementing a link state database (LSDB) with the teachings of the present invention is first described.

Figure 1:
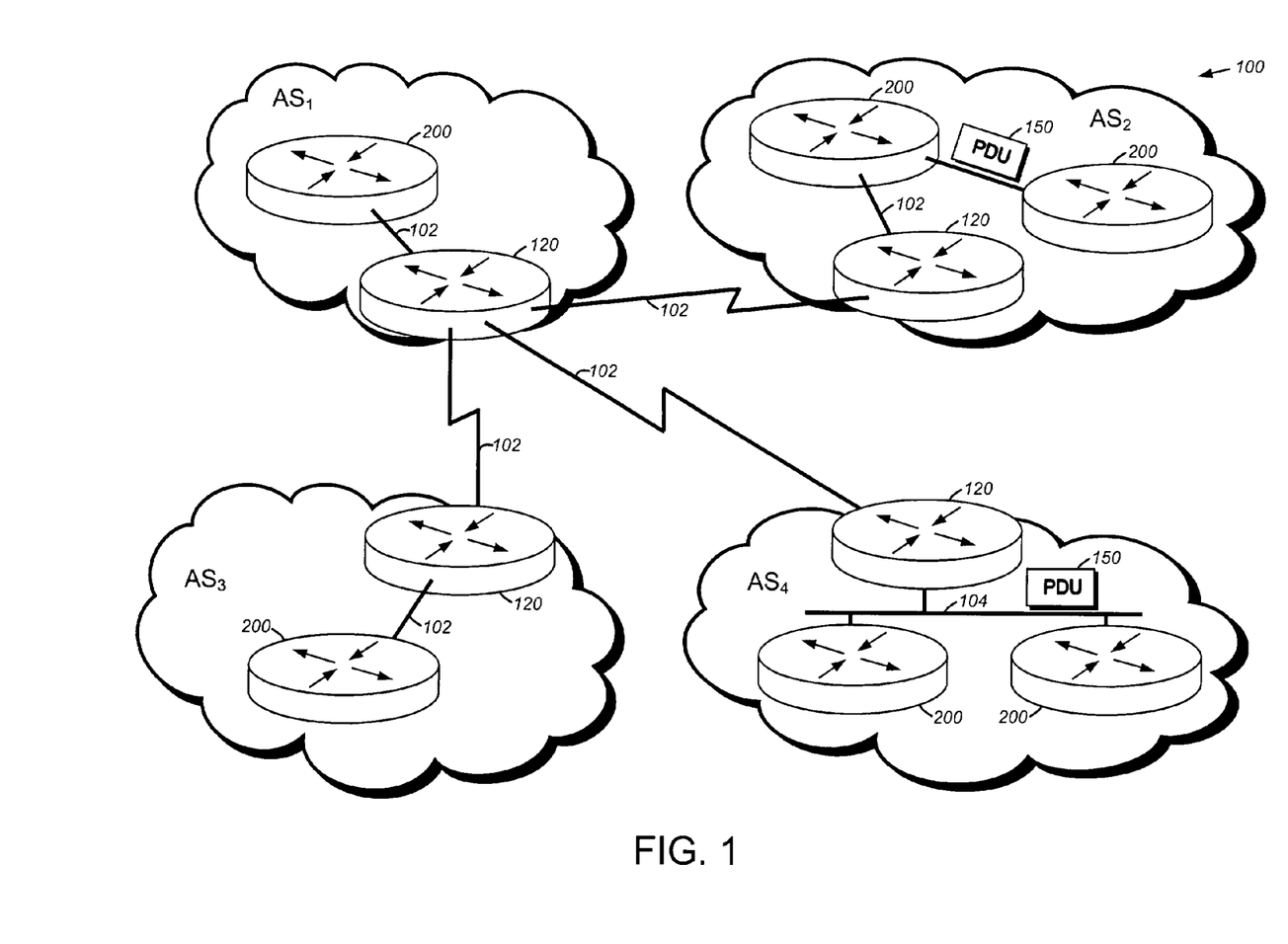
FIG. 1 is a schematic block diagram of a computer network comprising a plurality of autonomous systems or routing domains including intermediate nodes, such as intra-domain routers.

FIG. 1 is a schematic block diagram of a computer network 100 comprising a plurality of routing domains or autonomous systems interconnected by intermediate nodes, such as conventional interdomain routers 120 and intradomain routers 200. As used herein in autonomous system is a group of routers exchanging routing information via common routing protocol. The interdomain routers 120 interconnect various autonomous systems ($AS_{1-4}$), whereas the intradomain routers 200 manage communication media and nodes within their respective AS domains. The communication media include shared medium networks 104, such as local area network (LAN) subnetworks, point-to-point links 102 and non-broadcast multi-access (NBMA) clouds such as frame relay or asynchronous transfer mode networks. Communication among the routers is typically effected by exchanging discrete data units or packets in accordance with predefined protocols, such as the Transmission Control Protocol/Internet Protocol (TCP/IP). It will be understood to those skilled in the art that other protocols, such as the Internet packet exchange (IPX) protocol and associated link state routing protocols (e.g., NLSP), may be advantageously used with the present invention.

Figure 2:
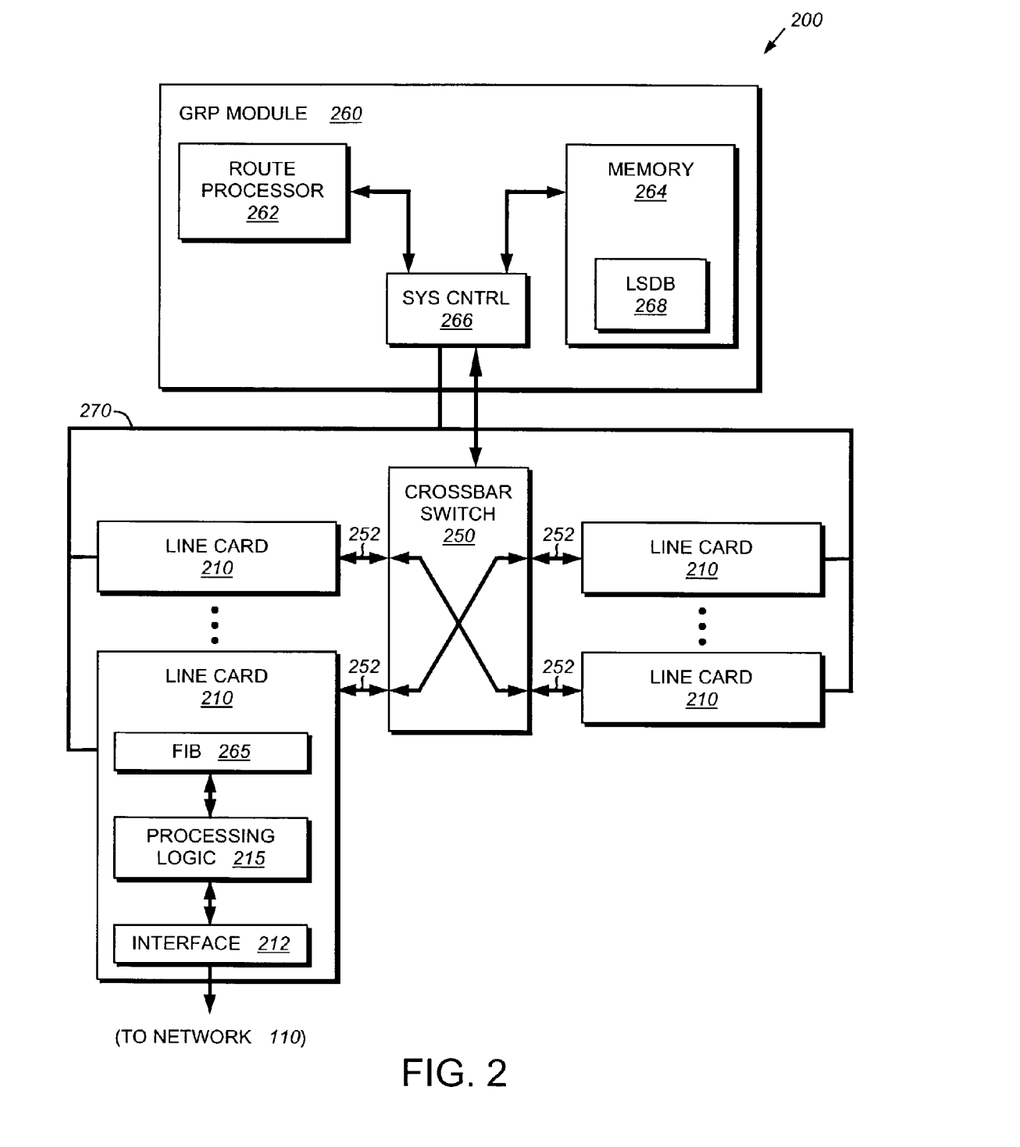
FIG. 2 is a schematic block diagram of a router that may be advantageously used with the present invention.

FIG. 2 is a schematic block diagram of an intradomain router 200. An example of the router 200 that may be illustratively used with the present invention is the GSR 12000 series gigabit switch router (GSR) available from Cisco Systems, Inc. of San Jose, Calif. The router 200 is preferably based on a high-speed distributed architecture optimized for routing and packet forwarding functions. To that end, the router comprises a gigabit route processor (GRP) module 260 and a plurality of line cards 210 interconnected by a crossbar switch 250. The crossbar switch 250 is a multi-gigabit crossbar switching fabric configured to provide high-capacity switching operations at gigabit rates among the line cards over point-to-point serial data lines 252. Each line card 210 includes at least one interface 212 comprising circuitry needed to connect the router to a communication medium of the network. Each line card 210 further includes conventional processing logic 215 needed to perform the packet-forwarding functions for the router.

The GRP module 260 is a processor-based, routing system suite comprising functionality incorporated within a typical router. That is, the GRP module comprises a route processor 262 coupled to a memory 264 via a system controller 266. The memory 264 may comprise synchronous dynamic random access memory (SDRAM) storage locations addressable by the processor 262 for storing software programs and data structures. A network routing operating system, portions of which are typically resident in memory and executed by the route processor, functionally organizes the router by, inter alia, invoking network operations in support of software processes executing on the router. It will be apparent to those skilled in the art that other memory means, including various computer readable media, may be used for storing and executing program instructions pertaining to the operation of the router.

The route processor 262 performs configuration management and control functions for the router 200 and communicates with neighboring peer routers to exchange protocol data units (PDUs) used to construct routing tables in accordance with conventional routing algorithms. The route processor also computes and loads forwarding information base (FIB) tables 265 used by the line cards 210. A copy of the FIB tables 265 computed by the route processor 262 is distributed to each line card 210 over a management control bus 270. Each "source" line card performs an independent lookup of a destination address for each incoming packet using a local copy of the FIB table and then forwards the packet over the crossbar switch 250 to a "destination" line card.

The functional infrastructure of the router 200 is preferably divided into a data plane and a control plane. The data plane includes components used to retrieve data packets from the network and provide those packets to forwarding logic of the router (and vice versa). In contrast, the control plane includes those entities used to manage/control traffic forwarding operations of the router. In the illustrative embodiment, the infrastructure of the router includes distributed processing logic 215 configured to perform packet forwarding operations and physical port interfaces 212 resident on the line cards 210 that do not have direct access to the route processor 262 over the data plane. This infrastructure allows the router to continue performing traffic forwarding operations throughout the data plane in the presence of a failure or software reload within the control plane. In essence, the infrastructure enables the intradomain router 200 to function as a non-stop forwarding (NSF) capable router.

Figure 3:
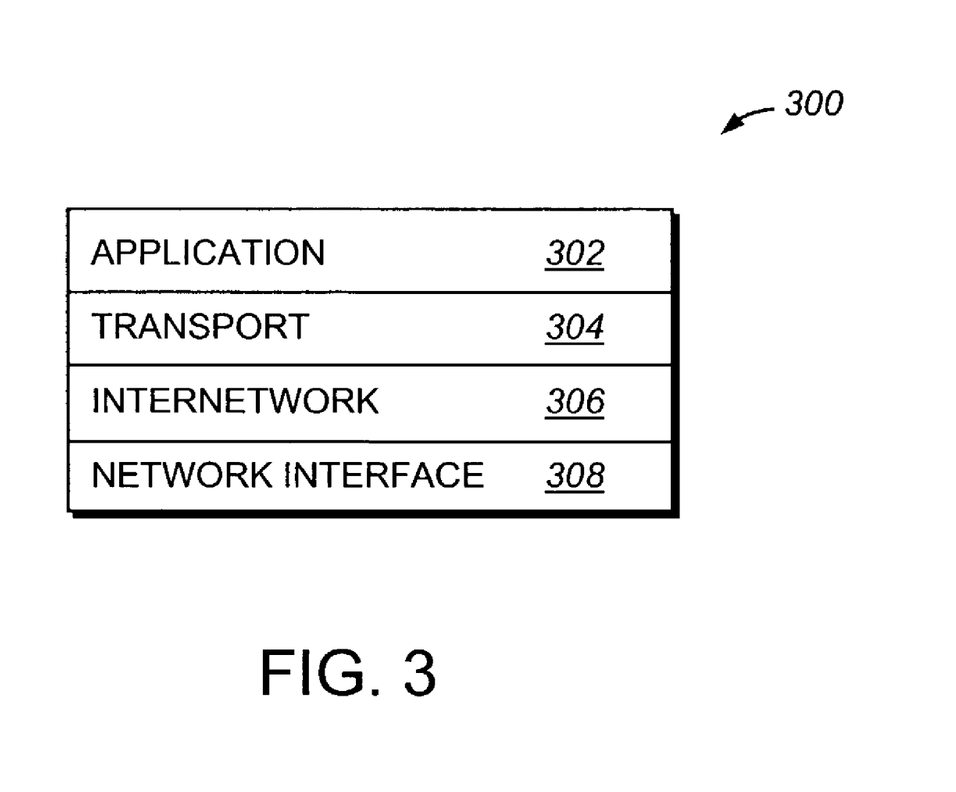
FIG. 3 is a schematic block diagram of a conventional protocol stack, such as the Internet communications protocol stack, within the router of FIG. 2.

A key function of the router is determining the next node to which a packet is sent; in order to accomplish such "routing" the routers cooperate to determine optimal paths (i.e., "best links") through the computer network 100. The routing function is preferably performed by an internetwork layer of a conventional protocol stacked within each router. FIG. 3 is a schematic block diagram of a conventional protocol stack, such as the Internet communications protocol stack 300. The architecture of the Internet protocol stack 300 is represented by four layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the Internet protocol (IP). IP is primarily a connectionless protocol that provides internetwork routing, fragmentation and assembly of exchanged packets—generally referred to as "datagrams" in an Internet environment—and which relies on transport protocols for end-to-end reliability. An example of such a transport protocol is the Transmission Control Protocol (TCP) which is implemented by the transport layer 304 and provides connection-oriented services to the upper layer protocols of the Internet architecture. The term TCP/IP is commonly used to denote the Internet architecture.

In particular, the internetwork layer 306 concerns the protocol and algorithms that the routers 200 utilize so that they can cooperate to calculate paths through the computer network 100. An intradomain protocol may be used to perform intradomain routing (for the Internetwork layer) within each AS of the computer network 100. An example of a protocol used to distribute routing information between neighboring routers belonging to a single AS is the Open Shortest Path First (OSPF) link state routing protocol. The OSPF routing protocol is well known and described in detail in *Request for Comments (RFC) 2328, OSPF version 2*, by J. Moy (1998) and *Interconnections, Second Edition* by R. Perlman, published by Addison Wesley Publishing company (2000).

In a link state routing protocol, each intradomain router maintains a link state database (LSDB 268, shown in FIG. 2) and each participating intradomain router has an identical LSDB. Each individual piece of the LSDB is a particular router's local state (e.g., the router's usable interfaces and reachable neighbors) that is distributed by the router throughout the AS in accordance with a flooding algorithm. The reachable neighbors (e.g., other intradomain routers 200 within $AS_{2,4}$ of FIG. 1) are associated with the intradomain router through an adjacency relationship that enables the exchange of routing information between the routers. This adjacency relationship is established and maintained using a conventional Hello protocol defined by the OSPF routing protocol.

B. Hello Protocol and Network Configuration

Figure 4:
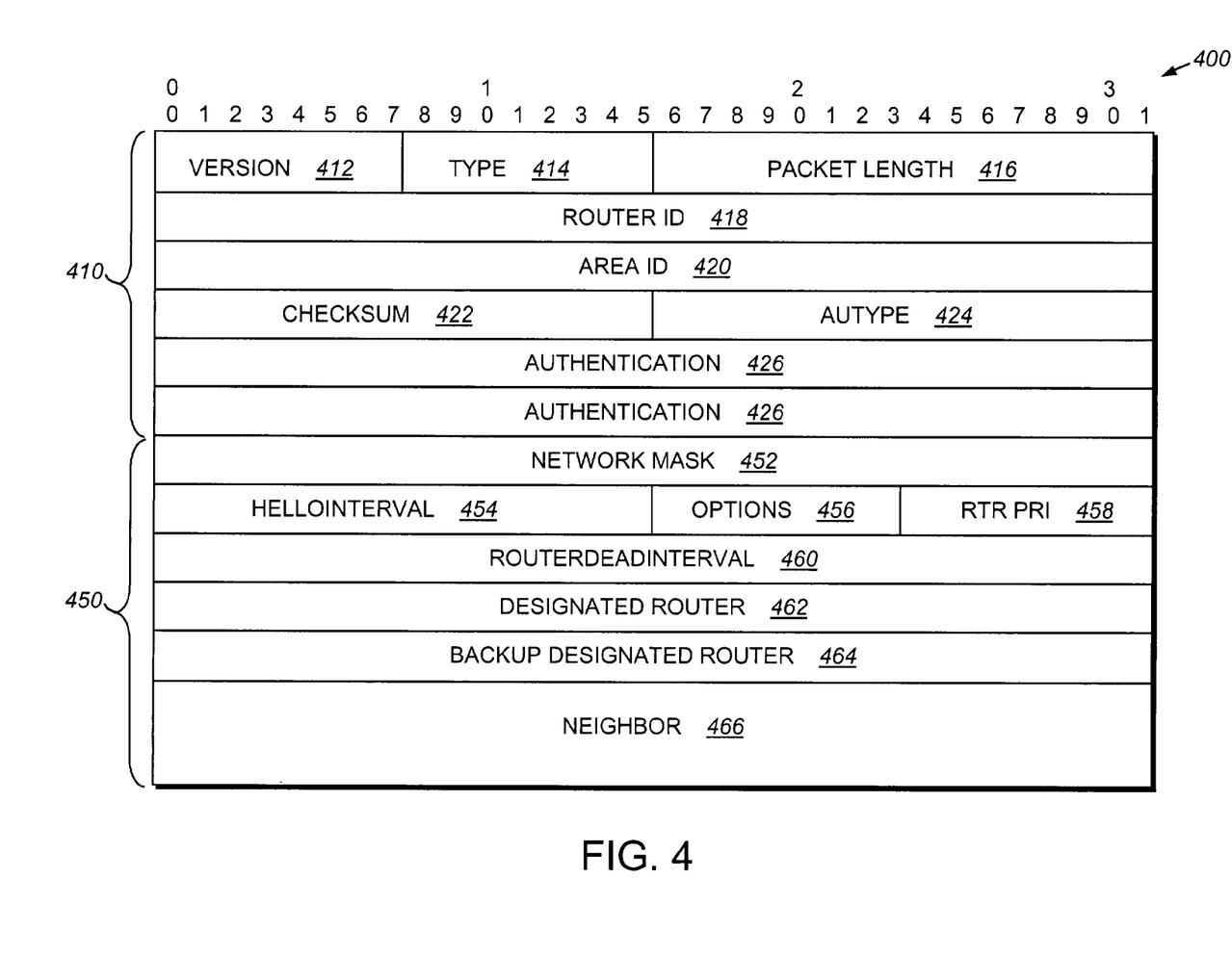
FIG. 4 is a schematic block diagram depicting the format of a Hello packet that may be advantageously used with the present invention.

FIG. 4 is a schematic block diagram depicting the format of a conventional Hello packet 400 comprising an OSPF packet header 410 and Hello-specific packet fields 450. All OSPF packets are encapsulated within IP packets and each OSPF packet, such as a Hello packet, starts with a standard 24-byte OSPF header 410. The header contains information needed to determine whether the packet should be accepted for further processing. The Hello packet is an OSPF type 1 packet that is periodically sent over interfaces of the router to establish and maintain neighbor adjacencies. All routers connected to a common network must agree on certain parameters, such as HelloInterval and RouterDeadInterval, included in the Hello packet. It should be noted that disagreement over these parameters may inhibit the forming of the neighbor adjacencies.

The OSPF packet header 410 includes a version field 412 containing the OSPF version number, a type field 414 containing the type of OSPF packet and a packet length field 416 including the length of the OSPF protocol packet in bytes. The header 410 also includes a router ID field 418 containing the router identifier (ID) of the source of the packet and an area ID field 420 whose contents identify the area to which the packet belongs. A checksum field 422 containing a standard IP checksum of the entire contents of the packet, starting with the OSPF packet header but excluding a 64-bit authentication field. An authentication type (AuType) field 424 identifies the authentication procedure to be used for the packet and authentication field 426 contains a 64-bit value for use by the authentication scheme.

The Hello-specific packet fields 450 include a network mask field 452 identifying the network mask associated with the particular router interface. A HelloInterval field 454 contains a value representing the number of seconds between Hello packets issued by the router, while an options field 456 identifies optional capabilities supported by the router. A router priority value is contained in a router priority (Rtr Pri) field 458 and a RouterDeadInterval field 460 includes a value (i.e., an "inactivity timer") indicating the number of seconds before declaring a silent router down. A designated router field 462 identifies the designated router (DR) for the network, whereas a backup designated router field 464 identifies the backup designated router (BDR) for the network. Lastly, a neighbor field 466 contains the router ID of each router from whom valid Hello packets have been recently received over the network.

When a NSF-capable router reloads its routing software (e.g., OSPF routing protocol software module) it does not actively send Hello packets since it does not know its neighbors. If the router sends Hello packets that do not contain the router IDs of the neighbors, those neighbors destroy the existing adjacencies. To avoid such a situation, it is desirable to make an OSPF routing module reload sequence transparent to the NSF router's neighbors. To that end, a technique is provided that maintains those existing adjacencies between the NSF router and its neighbors during reload of a new instance of the OSPF software. An example of such a technique is disclosed in co-pending and commonly-assigned U.S. patent application Ser. No. 09/925,827, now issued as U.S. Pat. No. 7,065,059, titled, Technique for Restoring Adjacencies in OSPF in a Non-Stop Forwarding Intermediate Node of a Computer Network, which application is hereby incorporated by reference as though fully set forth herein.

Figure 5:
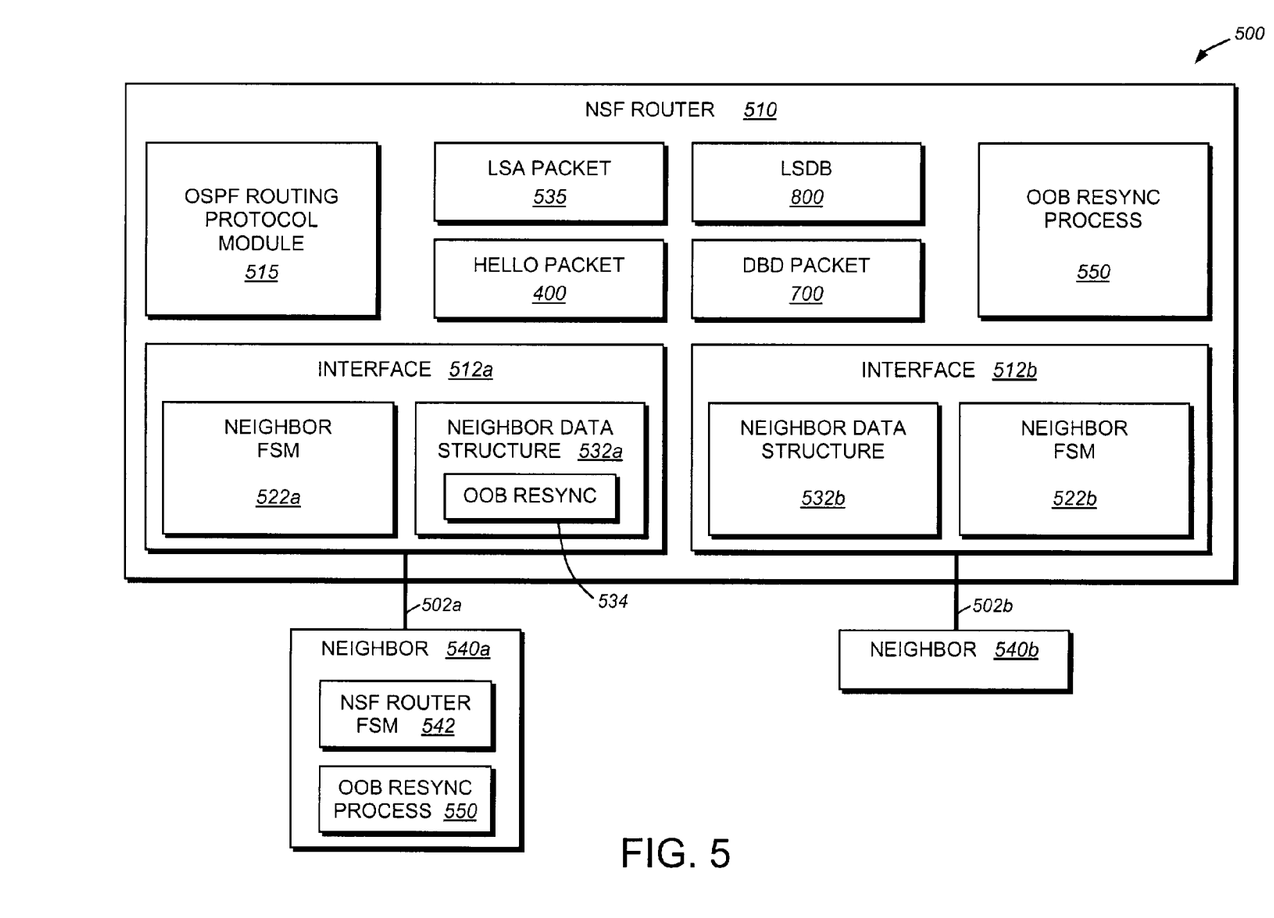
FIG. 5 is a schematic block diagram of a network configuration having adjacencies between the router and its neighbors.

FIG. 5 is a schematic block diagram of a network configuration 500 having adjacencies 502a,b between a NSF router 510 and its neighbors 540a,b over a broadcast interface 512a and a point-to-point interface 512b of the router. Assume an OSPF routing module 515 of the NSF router is reloaded and the router has "picked up" the adjacencies 502a,b with its neighbors using, e.g., the technique described above such that the router "knows" all of its previous neighbors. The router then requests all link state advertisement (LSA) packets 535 from its neighbors because its LSDB 568 is in a re-initialized "empty" condition due to the reloading/restarting of the OSPF software. The format of the LSA packet is well known and described in RFC 2328. Thus, an LSDB resynchronization sequence is performed to resynchronize the router LSDB with that of its neighbor. To initiate resynchronization of its LSDB with each neighbor LSDB, a router typically (i.e., in a non-NSF fashion) places a conventional finite state machine (FSM 522a,b) associated with each neighbor in a particular state, e.g., an ExStart state. In accordance with the present invention, a synchronization process is involved when the router enters the Exchange state.

Figure 6:
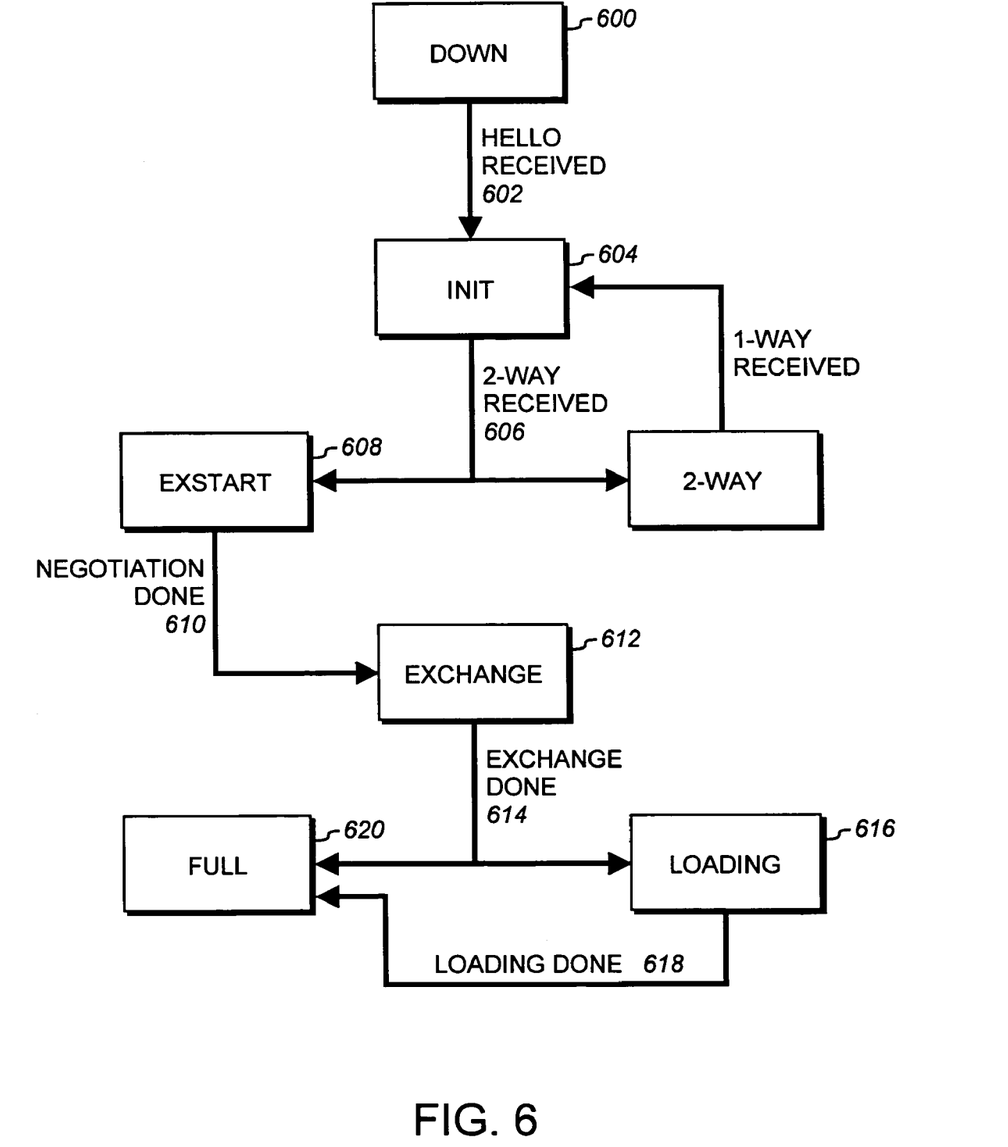
FIG. 6 is a state diagram illustrating various states of a finite state machine associated with a neighbor of the router.

FIG. 6 is a state diagram illustrating various states of the neighbor as provided by a neighbor FSM. The ExStart state 608 represents the first step in creating an adjacency that allows an OSPF process executing on a neighbor to send initial database description (DBD) packets to the router. DBD packets are OSPF type 2 packets that are exchanged when an adjacency is being initialized. A DBD packet describes the contents of the LSDB and typically multiple DBD packets are used to describe the LSDB. For this purpose, a poll-response procedure is used wherein one of the routers is designated a master and the other is designated a slave. The master sends DBD packets (polls) which are acknowledged by DBD packets sent by the slave (responses). The responses are linked to the polls via DD sequence numbers of the packets.

Figure 7:
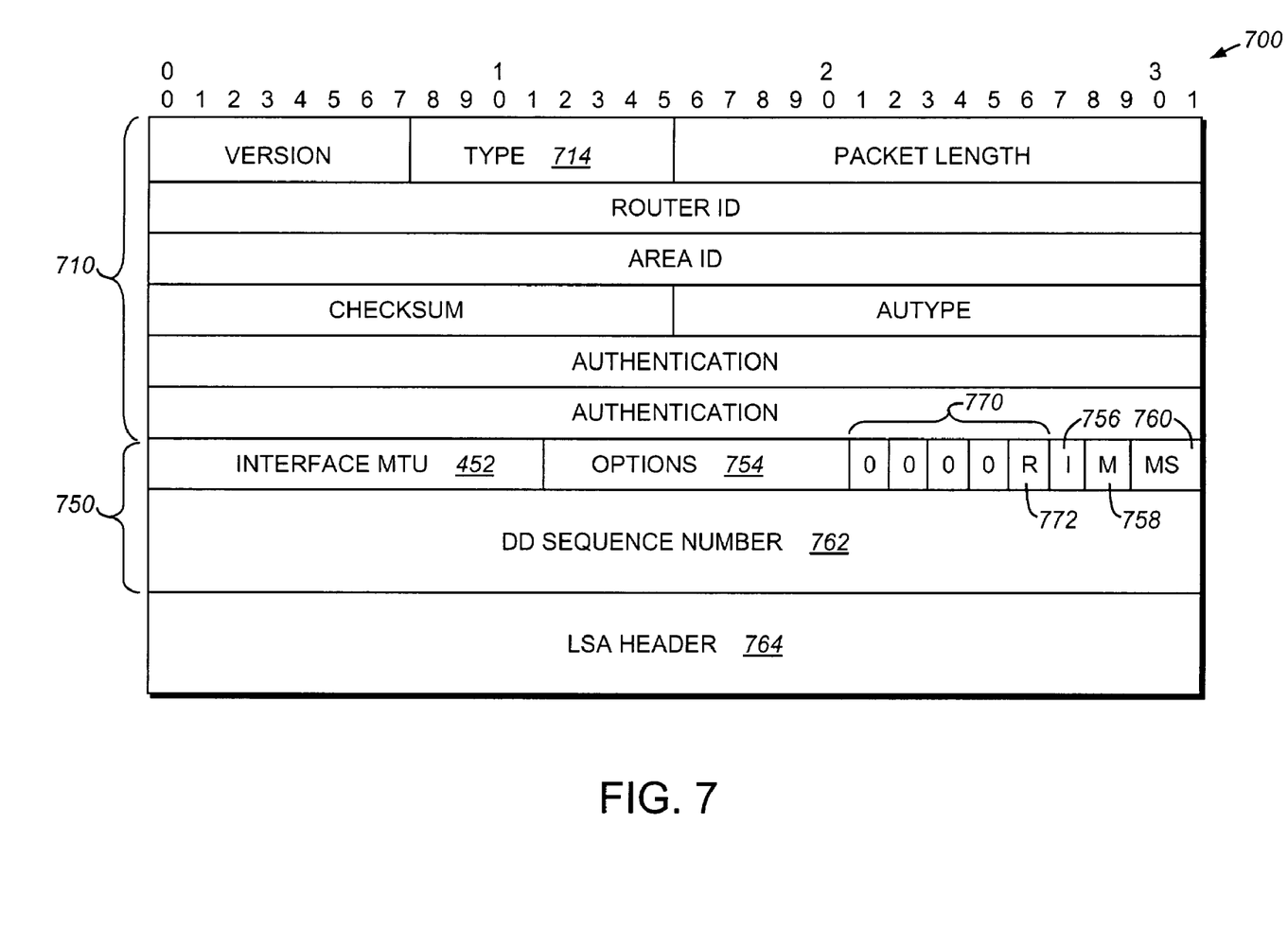
FIG. 7 is a schematic block diagram depicting the format of a database description (DBD) packet that may be advantageously used with the present invention.

FIG. 7 is a schematic block diagram depicting a DBD packet 700 that may be advantageously used with the present invention. The DBD packet 700 includes an OSPF header 710 similar to the OSPF 410 of the Hello packet 400. In addition, the DBD packet comprises DBD-specific packet fields 750, including an interface MTU field 752 containing the size in bytes of the largest IP datagram that can be sent out the associated interface without fragmentation. The fields 750 also include an options field 754 that identifies optional capabilities supported by the router, and various bit fields (I-bit 756, M-bit 758 and MS-bit 760). A DD sequence number field 762 is used to sequence the collection of DBD packets, while an LSA header field 764 contains a list of link-state database pieces, as identified by LSA headers.

Referring to again FIGS. 5 and 6, assume the NSF router 510 has not yet received any Hello packets 400 from neighbor 540a over broadcast interface 512a. A neighbor data structure 532a is created for neighbor 540a when a first incoming Hello packet is received at the NSF router from neighbor 540a. The neighbor FSM 522a then moves from a Down state 600 to an Init state 604. The neighbor FSM 522a remains in this state until the neighbor 540a lists the NSF router 510 in its Hello packets. The event HelloReceived 602 indicates reception of a Hello packet that may or may not list the NSF router. When the NSF router receives an incoming Hello packet from neighbor 540a that contains its (the NSF router's) router ID, it implies that the NSF router has also listed neighbor 540a in the Hello packets it sends over the interface 512a.

Once the neighbor data structure 532a is created for neighbor 540a, the NSF router sends Hello packets 400 with neighbor 540a listed in the packets. This same sequence occurs with the remote neighbor 540a. Upon the NSF router receiving an incoming Hello packet 400 from neighbor 540a with the NSF router's ID listed in the packet, there is 2-way communication between the router 510 and neighbor 540a. This condition is needed to generate a 2-Way Received event 606, which transitions the neighbor FSM 522a from the Init state 604 to, e.g., the ExStart state 608.

In the ExStart state 608, the NSF router 510 begins LSDB synchronization with its neighbor 540a. That is, the router and neighbor negotiate as to the master/slave status of each router and as to the initial sequence number for the DBD packets to be exchanged. Upon completion of negotiation (Negotiation Done 610), the neighbor FSM 522a transitions to an Exchange state 612 where the DBD packets 700 are received, i.e., where the neighbor reliably exchanges its database description with the router. Once the DBD packets 700 are reliably exchanged (Exchange Done 614), it is known which, if any, LSA packets 535 are still needed from the neighbor X. If any LSA packets are needed, the neighbor FSM 522a transitions to a Loading state 616 where the needed packets are requested. Once the list of requested LSA packets is empty or there are no further LSA packets requested (Loading Done 618), the neighbor FSM 522a transitions to a Full state 620.

After reaching the Full state, if the NSF router receives an initial DBD packet 700 from neighbor 540a, it forces its neighbor FSM 522a back to the ExStart state 608. This may indicate that routing software on neighbor 540a has been restarted/reloaded and that neighbor 540a has received a Hello packet 400 from the NSF router that lists the neighbor 540a. However, forcing the neighbor FSM 522a into the ExStart state 608 causes the neighbor 540a to do the same action, i.e., transition ("move") its neighbor (i.e., NSF router) FSM 542 from the Full state 620 to the ExStart state 608. This results in destroying ("dropping") of the adjacency 502a between the NSF router 510 and neighbor 540a such that transit data traffic cannot be forwarded over the corresponding interface 512a of the router 510. Such a situation prevents the router 510 from functioning as a NSF-capable router. Yet, an OSPF router, such as NSF router 510, typically resynchronizes its LSDB with the LSDB of a neighbor by forcing the neighbor FSM into the ExStart state.

C. Link State Database Snap shot For Neighbor Synchronization

Specifically, the present invention comprises a system and method for providing a link state database snapshot for use during the neighbor synchronization process.

Figure 8:
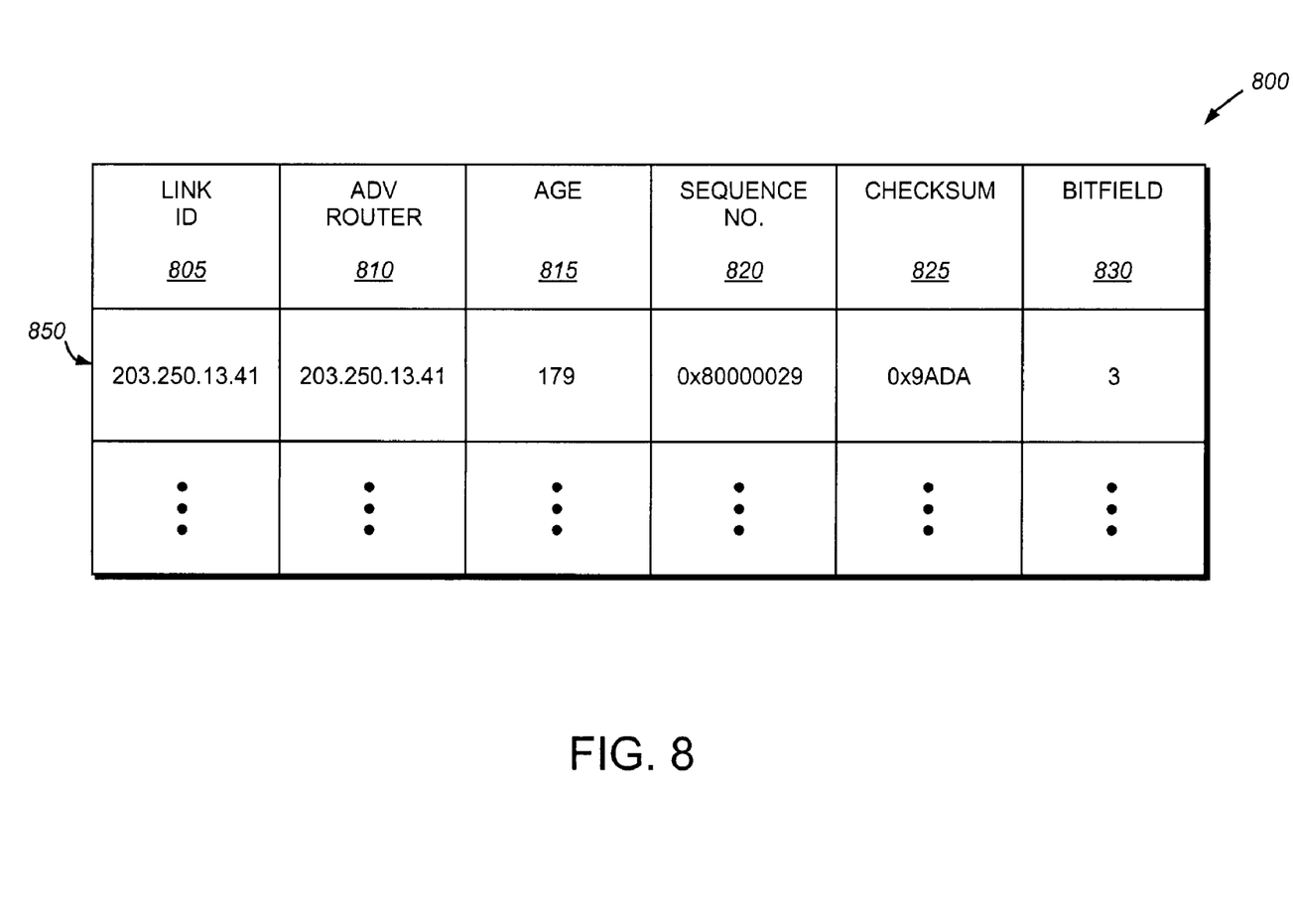
FIG. 8 is a schematic block diagram of an exemplary link state database in accordance with an embodiment of the present invention.

An exemplary link state database 800 is shown in FIG. 8. The link state database 800 includes various fields including fields for a link identifier (ID) 805, an ADV router 810, an age 815, a sequence number 820, a checksum 825 and, in an exemplary embodiment, a bit field 830. The link identifier 805 and ADV router 810 operate to identify the particular network address associated with a device in the link state database. The age entry 815 identifies how old this particular entry is in the link state database. The optional bit field 830 is utilized by the present invention for generating a snapshot of the link state database.

The bit field 830, which in an exemplary embodiment can be dynamically generated and attached to an entry of a link state database is used in the present invention to track which entries of the link state database are to be synchronized with a given neighbor.

Figure 9:
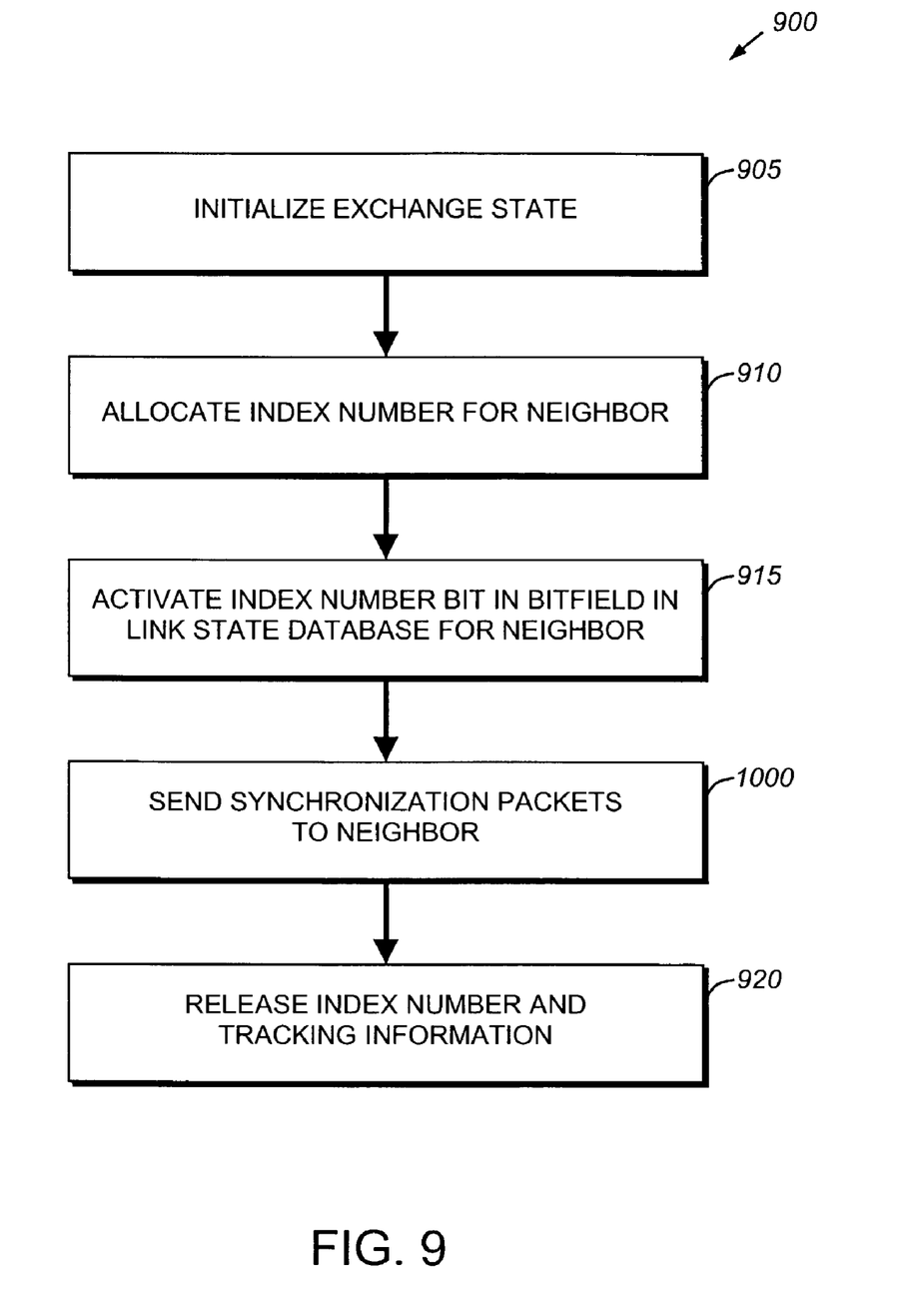
FIG. 9 is a flow chart detailing the steps of a procedure for providing a link state database snapshot during a neighbor synchronization process in accordance with an embodiment of a present invention.

In accordance with an embodiment of the present invention, when a router enters the Exchange state, the router begins executing a procedure 900 as shown in FIG. 9. Initially, in step 905, the router initializes into the Exchange state. Next, in step 910, the router allocates an index number for a given neighbor. This index number is utilized to identify the linked state database that are to be synchronized with the neighbor. Each index number may be, in accordance with an illustrative embodiment, recycled or reused at the completion of a synchronization. Then, in step 915, an appropriate bit is set in the bit field for each record in the link state database that is to be synchronized with the neighbor. By setting the appropriate bit in the bit field, the procedure alerts other processes within the router that the particular entry is to be synchronized with a given neighbor. After the bit field has been set, then the router sends the appropriate synchronization packets comprising database description (DBD) packets to its neighbor in step 1000. After the synchronization or DBD packets have been successfully sent, then the router releases the index number for future use and also frees the tracking information used in determining its current position within the link state database.

Figure 10:
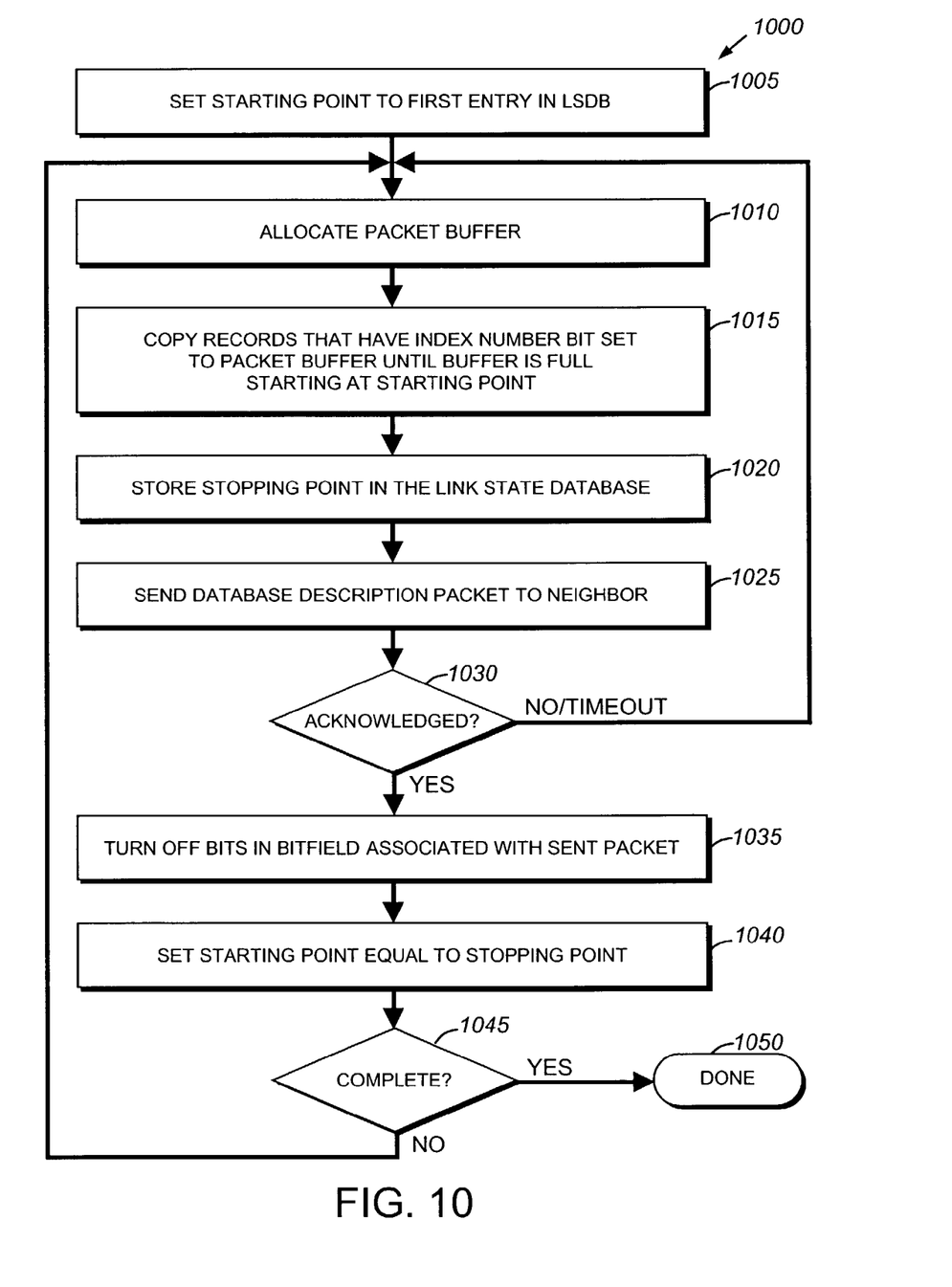
FIG. 10 is a flow chart detailing the steps of a procedure for transmitting synchronization packets or database description packets to a neighbor in accordance with an embodiment of the present invention.

The step of sending synchronization packets to the neighbor 1000 is further shown in FIG. 10. Initially, in step 1005, the procedure sets a starting point to the first entry in the link state database. The starting point can be embodied as a variable to track the initial location within the LSDB for generating database description packets as described further below. Next, in step 1010, a packet buffer to hold the DBD is allocated. The procedure then steps through the link state database copying all records that have the appropriate bit set in the bit filed associated with the index number to the packet buffer (step 1015). This copying continues until the packet buffer is full. Once the packet buffer is full, then the procedure stores the stopping point in step 1020. The stopping point identifies the location within the link state database where the copying ended. Next, in step 1025, the database description packet (DBD) is sent to the appropriate neighbor. Once the DBD has been sent to the neighbor, the procedure waits for the packet to be acknowledged (step 1030). If the packet is not acknowledged or the procedure otherwise times out, then the procedure loops back to step 1010 and continues.

If the packet is acknowledged then the procedure turns off or deactivates the bits in the bit field associated with the records that were sent in the previous packet in step 1035. After deactivating the appropriate bits, then the procedure sets the starting point equal to the stopping point in step 1040. The procedure then determines if it has completed sending all appropriate records in a link state database in step 1045. If the procedure has completed the transfer of information from the link state database then the procedure branches to step 1050 and is complete.

By utilizing this system and method, only one DBD packet is stored in the packet buffer memory at any given time, thereby reducing the possibility that all available packet buffer memory will be exhausted by performing a resynchronization procedure. By setting the appropriate bits in a bit field corresponding to an index number for a given neighbor, the system and method effectively generates a "snapshot" or point-in-time image to be sent to the neighbor during the resynchronization procedure.

To again summarize, in accordance with the present invention, when a router enters a Exchange state to perform a resynchronization procedure, an index number is generated that is associated with the neighbor to be updated. This index number is stored in a bit field associated with the link state database on the router. In an alternative embodiment, the bit field can be dynamically generated when needed. After the index number is generated, then the system and method transfers, using DBD packets the appropriate link state database information to the neighbor by looping through the link state database and generated singular packets containing the appropriate information. By only generating one packet at a time, the procedure ensures that multiple DBD packets are not stored in the packet buffer memory at any given time. This works to advantageously prevent the complete exhaustion of available packet buffer memory due to storing multiple DBD packets in packet buffer memory.

The foregoing description has been directed to specific embodiments of this invention. It will be apparent, however, that other variations and modifications may be made to the described embodiments, with the attainment of some or all of their advantages. It should be noted that the inventive concepts described may be implemented as software, including computer-readable medium executing on a computer, hardware, firmware or any combination thereof. Therefore, it is the object of the appended claims to cover all such variations and modifications as come within the true spirit and scope of the invention.

What is claimed is:

1. A method for resynchronizing a link state database of a router with a link state database of a neighboring router in a computer network, the method comprising the steps of:
    allocating an index number associated with the neighboring router;
    marking an index number bit in a bit field associated with the link state database of the router, the index number bit identifying records within the link state database to be sent to the neighboring router; and
    sending a set of database description packets to the neighboring router, the database description packets containing the records identified by the index number bit set in the bit field.

2. The method of claim 1 further comprising the step of releasing the index number.

3. The method of claim 2 wherein the released index number can be reused by the router in a future resynchronization.

4. The method of claim 1 wherein the index number uniquely identifies the neighboring router.

5. The method of claim 1 wherein the bit field associated with the link state database is dynamically generated.

6. The method of claim 1 wherein the step of sending a set of database description packets to the neighboring router further comprises the steps of:
    (a) setting a starting point to a first entry in the link state database;
    (b) allocating a packet buffer;
    (c) generating a database description packet in the allocated packet buffer;
    (d) sending the database description packet to the neighboring router;
    (e) determining if all records that have been marked with the index number bit in the bit field have been sent;
    (f) deactivating, in response to not all of the records being sent index number bits associated with records that have been sent in the previous database description packet;
    (g) setting the starting point equal to a stopping point in generating the database description packet; and
    (h) looping, in response to determining that not all records have been sent, to step (b).

7. The method of claim 1 wherein the records of the link state database further comprise entries for a link identifier, a router, an age, a sequence number, a checksum and a bit field.

8. The method of claim 7 wherein the bit field is dynamically generated.

9. A computer readable medium containing executable program instructions for resynchronizing a link state database of a router a link state database of a neighboring router in a computer network, the executable program instructions comprising program instructions for:
    generating an index number associated with the neighboring router;
    marking an index number bit in a bit field associated with the link state database of the router, the index number bit identifying records within the link state database to be sent to the neighboring router; and sending a set of database description packets to the neighboring router, the database description packets containing the records identified by the index number bit set in the bit field.

10. The computer readable medium of claim 9 further comprising instructions for releasing the index number.

11. The computer readable medium of claim 10 wherein the released index number can be reused by the router in a future resynchronization.

12. The computer readable medium of claim 9 wherein the index number uniquely identifies the neighboring router.

13. The computer readable medium of claim 9 wherein the bit field associated with the link state database is dynamically generated.

14. The computer readable medium of claim 9 wherein instructions for sending a set of database description packets to the neighboring router further comprises instructions for:
    (i) setting a starting point to a first entry in the link state database;
    (j) allocating a packet buffer;
    (k) generating a database description packet in the allocated packet buffer;
    (l) sending the database description packet to the neighboring router;
    (m) determining if all records that have been marked with the index number bit in the bit field have been sent;
    (n) deactivating, in response to not all of the records being sent index number bits associated with records that have been sent in the previous database description packet;
    (o) setting the starting point equal to a stopping point in generating the database description packet; and
    looping, in response to determining that not all records have been sent, to step (b).

15. An apparatus for resynchronizing a link state database of a router with a link state database of a neighboring router in a computer network, the apparatus comprising:
    means for allocating an index number associated with the neighboring router;
    means for marking an index number bit in a bit field associated with the link state database of the router, the index number bit identifying records within the link state database to be sent to the neighboring router; and
    means for sending a set of database description packets to the neighboring router, the database description packets containing the records identified by the index number bit set in the bit field.

16. The apparatus of claim 15 further comprising means for releasing the index number.

17. The apparatus of claim 16 wherein the released index number can be reused by the router in a future resynchronization.

18. The apparatus of claim 15 wherein the index number uniquely identifies the neighboring router.

19. The apparatus of claim 15 wherein the bit field associated with the link state database is dynamically generated.

20. The method of claim 15 wherein the means for sending a set of database description packets to the neighboring router further comprises means for:
    (p) setting a starting point to a first entry in the link state database;
    (q) allocating a packet buffer;
    (r) generating a database description packet in the allocated packet buffer;
    (s) sending the database description packet to the neighboring router;
    (t) determining if all records that have been marked with the index number bit in the bit field have been sent;
    (u) deactivating, in response to not all of the records being sent index number bits associated with records that have been sent in the previous database description packet;
    (v) setting the starting point equal to a stopping point in generating the database description packet; and
    (w) looping, in response to determining that not all records have been sent, to step (b).

21. The apparatus of claim 15 wherein the records of the link state database further comprise entries for a link identifier, a router, an age, a sequence number, a checksum and a bit field.

22. The method of claim 21 wherein the bit field is dynamically generated.

23. An apparatus, comprising:
    a memory configured to associate an index number with a neighboring router;
    a link state database storing a plurality of records, at least some of the records marked to indicate the index number in a bit field, to identify the records within the link state database to be sent to the neighboring router; and
    a network interface configured to send a set of database description packets to the neighboring router, the database description packets containing the records marked with the index number in the bit field.

24. The apparatus of claim 23 wherein the memory is further configured to release the index number after the set of database description packets are sent, to permit the index number to be reused with another neighboring router.

25. The apparatus of claim 23 wherein the index number uniquely identifies the neighboring router.

26. The apparatus of claim 23 wherein the bit field is dynamically generated when needed.

27. The apparatus of claim 23 wherein the records of the link state database further comprise entries for a link identifier, a router, an age, a sequence number, and a checksum.

* * * * *